United States Patent Office 2,939,881
Patented June 7, 1960

2,939,881

IODO-BENZOIC ACID DERIVATIVES

Philip E. Wiegert, St. Louis, Mo., assignor to Mallinckrodt Chemical Works, St. Louis, Mo., a corporation of Missouri No Drawing. Filed Mar. 20, 1957, Ser. No. 647,187

1 Claim. (Cl. 260—519)

This invention relates to organic compounds and more particularly to certain novel benzoic acid derivatives.

Briefly, the present invention is directed to a compound selected from the group consisting of compounds having the formula:

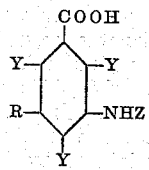

where Y is selected from the group consisting of hydrogen and iodine, Z is selected from the group consisting of hydrogen and lower acyl radicals, and R is a lower alkoxy radical, and the nontoxic salts and esters thereof. The invention also includes methods of preparing novel compounds of the class described.

Among the objects of the present invention may be noted the provision of new benzoic acid derivatives; the provision of new halogenated compounds; the provision of novel benzoic acid compounds which are useful intermediates for the preparation of new benzoic acid derivatives; and the provision of compounds of the type indicated which are useful for the preparation of roentgenographic contrast media. Other objects and features will be in part apparent and in part pointed out hereinafter.

The invention accordingly comprises the products and methods hereinafter described, the scope of the invention being indicated in the following claim.

The present invention is directed to the novel benzoic acids represented by the formula:

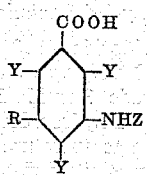

where Y is hydrogen or iodine, Z is hydrogen or a lower acyl group and R is a lower alkoxy group, and the salts and esters thereof.

In the synthesis of the novel compounds of the invention, it is convenient to use commercially available 3,5-dinitrobenzoic acid as the starting material. This compound is conveniently converted to 3-nitro-5-hydroxybenzoic acid by reduction of one nitro group with sodium hydrosulfide and diazotization of the resulting amine followed by hydrolysis of the diazo compound. The hydroxyl group is then alkylated, by means of the reaction of a dialkyl sulfate or other appropriate alkylating agent, such as an alkyl halide, upon the sodium or potassium salt of the hydroxy compound. The resulting 3-nitro-5-alkoxybenzoic acid is then reduced using an appropriate process, such as catalytic hydrogenation, or reduction by iron and acetic acid. The resulting 3-amino-5-alkoxybenzoic acid is then conveniently iodinated by means of iodine monochloride to a 3-amino-5-alkoxy-2,4,6-triiodobenzoic acid, which is then acylated by means of an acid anhydride or other appropriate acylating agent, such as acyl halide, to yield the corresponding 3-alkanamido-5-alkoxy-2,4,6-triiodobenzoic acid. The salts and esters of the invention are conveniently made from the acids by conventional means.

The 3-alkanamido-5-alkoxy-2,4,6-triiodobenzoic acids of the present invention are useful for the preparation of useful roentgenographic contrast media. For example, sterile aqueous solutions of the salts of these acids with nontoxic cations are of low toxicity and contain a high concentration of organically bound and substantially physiological inert iodine which can be administered intravenously. These iodinated compounds are rapidly excreted. The lower members of the series are excreted primarily through the urinary system; the higher members tend to be excreted more through the biliary system. The alkali metal and methylglucamine salts are particularly useful for this purpose. Solutions in other physiologically tolerable solvents are also useful for special purposes.

Dispersions of water-insoluble derivatives of the acids, such as their esters, are also useful, as for example, in visualizing hollow organs and cavities having external orifices through which the contrast preparation can be introduced and removed after the examination is completed.

The compounds are also useful for the preparation of other useful types of contrast media such as, for example, nonaqueous dispersions.

As is evident from the preceding description of the synthetic processes used in preparing the compounds of the invention, the 3-amino-5-alkoxybenzoic acids, both iodinated and uniodinated, are useful intermediates for the preparation of the 3-alkanamido-5-alkoxy-2,4,6-triiodobenzoic acids and other useful compounds.

The following examples illustrate the invention.

EXAMPLE 1

*3-nitro-5-methoxybenzoic acid*

A 50% solution of sodium hydroxide (65 g. NaOH) was added to a solution of 3-nitro-5-hydroxybenzoic acid (M.P., 189.2–190.2) (27 g.) in methanol (400 ml.). Dimethyl sulfate (195 g.) was added dropwise to the warm cloudy solution over a period of 1 hour. Additional dimethylsulfate (130 g.) was then added dropwise, along with sufficient portions of a 50% potassium hydroxide solution to keep the reaction mixture strongly alkaline. Stirring was continued for an additional hour and the system was kept alkaline. The solution was poured into 4 volumes of water, acidified with concentrated hydrochloric acid, chilled, and filtered. The product, 3-nitro-5-methoxybenzoic acid, was washed with water and dried. Yield, 21 g. (72.5%). Calculated for $C_8H_7NO_5$: Neutral equivalent, 197.2. Found: N.E., 200; M.P., 187–190° C. The acid was used in the following example without purification.

EXAMPLE 2

*3-amino-5-methoxybenzoic acid*

3-nitro-5-methoxybenzoic acid (20 g.) was added to a stirred refluxing mixture of ethanol (100 ml.), water (100 ml.), iron filings (60 g.) and acetic acid (2 ml.). The black mixture was stirred and heated under reflux for 1 hour, made alkaline with sodium carbonate, and filtered hot. The cake was washed with hot water and the filtrate and washings were acidified with hydrochloric acid and evaporated to dryness. The solid was slurried with alcohol and filtered to give 23 g. of a mixture of 3-amino-5-methoxybenzoic acid and inorganic salts. The mixture was used in the following example without purification.

EXAMPLE 3

*3-amino-5-methoxy-2,4,6-triiodobenzoic acid*

The mixture of 3-amino-5-methoxybenzoic acid and inorganic salts (23 g.) described in Example 2 was dissolved in water (500 ml.) containing concentrated hydrochloric acid (5 ml.). Iodine monochloride (50.5 g.) in concentrated hydrochloric acid (50.5 ml.) was added to the rapidly stirred mixture and after 20 minutes at room temperature the mixture was heated 15 minutes at 45° C., 1 hour at 50–60° C., and 3 hours at 70° C. The residual iodine monochloride was reduced with dilute sodium bisulfite solution and the suspension was chilled and filtered to give crude 3-amino-5-methoxy-2,4,6-triiodobenzoic acid (30 g.).

EXAMPLE 4

*3-acetamido-5-methoxy-2,4,6-triiodobenzoic acid*

A mixture of crude 3-amino-5-methoxy-2,4,6-triiodobenzoic acid (9.0 g.), acetic anhydride (40 ml.), and concentrated sulfuric acid (2 drops) was warmed on a steam bath for 1 hour. The mixture was then poured into ice water and allowed to stand overnight. The water was then decanted and the acid dissolved in dilute ammonium hydroxide. The pH was adjusted to 5 with acetic acid and the solution treated with decolorizing carbon four times. The crude product was precipitated by adding concentrated hydrochloric acid, filtered, washed, and dissolved in hot denatured alcohol. The solution was treated with decolorizing carbon, filtered, diluted with water and chilled to precipitate 3-acetamido-5-methoxy-2,4,6-triiodobenzoic acid. Yield, 4.5 g. (46.5%). Calculated for $C_{10}H_8I_3NO_4$: I, 64.9%; neutral equivalent, 587. Found: I, 62.8%; N.E., 583; M.P., 248.5–250.5° C.

EXAMPLE 5

*Sodium salt of 3-acetamido-5-methoxy-2,4,6-triiodobenzoic acid*

A suspension of 3-acetamido-5-methoxy-2,4,6-triiodobenzoic acid in a small volume of water was neutralized with sodium hydroxide solution, and the mixture was diluted to 40 ml. and methyl p-hydroxybenzoate (0.04 g.) was added as a preservative. The resulting solution contained 30% (w./v.) of the sodium salt of 3-acetamido-5-methoxy-2,4,6-triiodobenzoic acid. The solubility of the salt is approximately 34.6 g./100 ml. of water at 25° C.

The intravenous $LD_{50}$ of the sodium salt of 3-acetamido-5-methoxy-2,4,6-triiodobenzoic acid in mice was found to be greater than 14,700 mg./kg. of body weight. Excellent X-ray shadows of the kidney pelvis and ureters were obtained in anesthetized dogs after intravenous administration of a 30% solution of the sodium salt of 3-acetamido-5-methoxy-2,4,6-triiodobenzoic acid at a dose of 100 mg./kg. In one dog moderately good gall bladder shadows were produced.

EXAMPLE 6

*N-methylglucamine salt of 3-acetamido-5-methoxy-2,4,6-triiodobenzoic acid*

3-acetamido-5-methoxy-2,4,6-triiodobenzoic acid (112.5 g.) and N-methylglucamine (37.4 g.) were dissolved in warm water and the solution was treated with decolorizing carbon and filtered. The pH of the solution was adjusted to 7 and the volume was adjusted to 300 ml. The resulting 50% (w./v.) solution of the N-methylglucamine salt of 3-acetamido-5-methoxy-2,4,6-triiodobenzoic acid was sterilized by heating it in an autoclave at 15 p.s.i. steam pressure for 20 minutes.

EXAMPLE 7

*3-nitro-5-ethoxybenzoic acid*

A hot solution of potassium hydroxide (212 g.) in water (150 ml.) was added with stirring to a solution of 3-nitro-5-hydroxybenzoic acid (M.P. 190–192° C.) (54 g.) in ethanol (500 ml.). Diethyl sulfate (480 g.) was added under reflux with vigorous stirring in the course of 70 minutes. The temperature was maintained at 60–65° C. during the addition. From time to time it was necessary to allow by-product ether to distill from the reaction vessel to maintain the temperature. Half way through the addition of diethyl sulfate, ethanol (75 ml.) was added to the reaction mixture to make up for loss of solvent. A second batch of diethyl sulfate (315 g.) was then added to the reaction mixture during 2 hours. Periodically, portions of a solution of potassium hydroxide were added to keep the system strongly alkaline at all times. The mixture was stirred and held at 60–65° C. for an hour after all the diethyl sulfate had been added. The dark brown reaction mixture (1400 ml.) was then poured into cold water (3000 ml.) and acidified with concentrated hydrochloric acid. A brown oil separated which soon solidified. The suspension was cooled to 20° C. and filtered. The cake was pressed well on the filter, then dissolved in water (1000 ml.) and enough sodium hydroxide to give a pH of 8. The pH was adjusted to 7 with acetic acid and the solution treated twice with 4 g. portions of charcoal. The product, 3-nitro-5-ethoxybenzoic acid, was precipitated by the addition of dilute hydrochloric acid, filtered off and dried overnight at 110° C. Yield of crude 3-nitro-5-ethoxybenzoic acid: 51.1 g., M.P. 140.5–141.5° C. Calculated for $C_9H_9NO_5$: N.E., 211.1. Found: N.E., 218.

EXAMPLE 8

*3-amino-5-ethoxybenzoic acid*

A solution of crude 3-nitro-5-ethoxybenzoic acid (50 g.) in alcohol (175 ml.) was hydrogenated at a pressure of 25–40 p.s.i. in the presence of 5% palladium on charcoal catalyst (5 g.). Very slightly less than the theoretical quantity of hydrogen was absorbed during 2½ hours. The hydrogenated mixture was diluted to about 700 ml. with alcohol and heated to dissolve the precipitated product. The catalyst was removed by filtration and the filtrate evaporated to dryness under reduced pressure. Yield of crude 3-amino-5-ethoxybenzoic acid: 42.1 g. (98.0%), M.P. 164–167° C. Calculated for $C_9H_{11}NO_3$: N.E. 181.2. Found: N.E. 188.

EXAMPLE 9

*3-amino-5-ethoxy-2,4,6-triiodobenzoic acid*

95% iodine monochloride (120 g.) in concentrated hydrochloric acid (120 ml.) was added all at once to a stirred solution of crude 3-amido-5-ethoxybenzoic acid (42.1 g.) in concentrated hydrochloric acid (50 ml.) and water (1000 ml.) at a temperature of 47° C. A very thick cream-colored precipitate formed at once. High speed stirring broke up the mass and mixing was then satisfactory. The mixture was stirred at 60–70° for 6 hours. Excess iodine monochloride was reduced with aqueous sodium bisulfite and the mixture was cooled and the product filtered off. A sample dried at 110° C. had N.E. 465 (calculated for $C_9H_8I_3NO_3$, 558.9) and M.P. 155–159° C. Yield 102 g. Since the neutral equivalent was so low the above product was iodinated further. 100% iodine monochloride (40 g.) in concentrated hydrochloric acid (40 ml.) was added all at once to a slurry of the partially iodinated 3-amino-5-ethoxybenzoic acid (94.9 g.) in 1000 ml. of water and 25 ml. of concentrated hydrochloric acid heated to 45° C. The reaction mixture was stirred at about 75° C. for 4¼ hours. The unreacted iodine monochloride was reduced with aqueous sodium bisulfite solution; the slurry cooled to room temperature and the product filtered off. The product, crude 3-amino-5-ethoxy-2,4,6-triiodobenzoic acid, was dried at about 50° C. Calculated for $C_9H_8I_3NO_3$: N.E. 558.9. Found: N.E. 525; M.P. 185–187° C. Yield, 99.4 g. This crude product was suitable for acylation without further purification.

EXAMPLE 10

3-acetamido-5-ethoxy-2,4,6-triiodobenzoic acid

Concentrated sulfuric acid (3 drops) was added to a mixture of crude 3-amino-5-ethoxy-2,4,6-triiodobenzoic acid (10 g.) and acetic anhydride (40 ml.). The resulting mixture was heated on a steam bath for ½ hour with occasional swirling and was then poured into 300 ml. of hot water. Just enough concentrated ammonium hydroxide was added to make the system slightly alkaline, then the pH was adjusted to 5 with dilute hydrochloric acid. The solution was treated twice with decolorizing carbon and the product was precipitated by the addition of concentrated hydrochloric acid, filtered off and washed with water. Yield, 9.5 g. This 3-acetamido-5-ethoxy-2,4,6-triiodobenzoic acid product was recrystallized from ethanol-water, the solution being treated with decolorizing carbon. Calculated for $C_{11}H_{10}I_3NO_4$: N.E., 600.9; I, 63.4%. Found: N.E., 600; I, 62.7%; M.P. 252.2–253.7° C.

EXAMPLE 11

Sodium salt of 3-acetamido-5-ethoxy-2,4,6-triiodobenzoic acid

A solution of the sodium salt of 3-acetamido-5-ethoxy-2,4,6-triiodobenzoic acid was prepared by neutralizing a suspension of the acid with sodium hydroxide solution. A saturated solution of the sodium salt of 3-acetamido-5-ethoxy-2,4,6-triiodobenzoic acid at 24.5° C. had a density of 1.283 g./ml. at 24.5° C. The solubility of the sodium salt was 48.5 g./100 ml. of solution or 61.0 g./100 ml. of water.

EXAMPLE 12

N-methylglucamine salt of 3-acetamido-5-ethoxy-2,4,6-triiodobenzoic acid 3-acetamido-5-ethoxy-2,4,6-triiodobenzoic acid (15.3 g.) and N-methylglucamine (4.9 g.) were dissolved in enough water to make 40 ml. of solution. The pH of the resulting solution, which contained the N-methylglucamine salt of 3-acetamido-5-ethoxy-2,4,6-triiodobenzoic acid, was adjusted to about 7 with a little more of the amine. The solution was then sterilized by heating it at 15 p.s.i. steam pressure for 20 minutes.

The intravenous $LD_{50}$ of this salt in mice was found to be 9,540 mg./kg. Noticeable X-ray shadows of both the gall bladder and kidneys were produced after intravenous administration of the solution described in the preceding paragraph to dogs at a dosage of 100 mg. of the salt per kg. of body weight.

EXAMPLE 13

3-propionamido-5-ethoxy-2,4,6-triiodobenzoic acid

Crude 3-amino-5-ethoxy-2,4,6-triiodobenzoic acid (54 g.), prepared as described in Example 9, was dissolved in propionic anhydride (100 ml.) and concentrated sulfuric acid (1 ml.). The solution was heated on the steam bath for 3½ hours, cooled and poured into ice water. Concentrated ammonium hydroxide was added until the solution was alkaline, the pH was adjusted to 5 with acetic acid and the solution treated 3 times with decolorizing carbon. Addition of concentrated hydrochloric acid to the rather darkly colored solution resulted in the precipitation of a tan, gummy mass. The aqueous layer was decanted, the gum dissolved in dilute ammonium hydroxide, and the solution warmed on a steam bath for 15 minutes. The pH was adjusted to 5 with acetic acid, the solution treated with decolorizing carbon and the product precipitated by the addition of concentrated hydrochloric acid. The tan crystals were filtered and washed with water to give 46.5 g. of slightly damp solid. The product was recrystallized three times from ethanol and water, the solutions being treated with decolorizing carbon, to give 19.0 g. of cream-colored 3-propionamido-5-ethoxy-2,4,6-triiodobenzoic acid. Calculated for $C_{12}H_{12}I_3NO_4$: N.E., 615; I, 62.0%. Found: N.E., 610; I, 60.8%; M.P. 250.5–251.5° C. (dec.).

EXAMPLE 14

Sodium salt of 3-propionamido-5-ethoxy-2,4,6-triiodobenzoic acid

A slurry of 3-propionamido-5-ethoxy-2,4,6-triiodobenzoic acid was neutralized with sodium hydroxide solution. A saturated solution of the sodium salt of 3-propionamido-5-ethoxy-2,4,6-triiodobenzoic acid at 24° C. had a density of 1.3033 g./ml. at 24.5° C. The solubility of the sodium salt was found to be 55.0 g./100 ml. of solution or 73.4 g./100 ml. of water.

EXAMPLE 15

N-methylglucamine salt of 3-propionamido-5-ethoxy-2,4,6-triiodobenzoic acid 3-propionamido-5-ethoxy-2,4,6-triiodobenzoic acid (15.2 g.) and N-methylglucamine (4.8 g.) were dissolved in sufficient water to make 40 ml. of solution. The solution containing the N-methylglucamine salt of 3-propionamido-5-ethoxy-2,4,6-triiodobenzoic acid was filtered, then sterilized by heating it at 15 p.s.i. steam pressure for 20 minutes.

The intravenous $LD_{50}$ of this salt in mice was found to be 8,900 mg./kg. Upon intravenous administration of the solution described in the preceding paragraph to two dogs at a dosage of 100 mg. of salt per kg. of body weight, good X-ray shadows of the gall bladder were produced in one dog and good shadows of the kidney in the other dog.

EXAMPLE 16

3-amino-5-methoxybenzoic acid

A solution of 3-nitro-5-methoxybenzoic acid (25 g.) in ethanol (140 ml.) was hydrogenated at a pressure of 25–40 p.s.i. in the presence of 5% palladium on charcoal catalyst (4 g.). The mixture absorbed slightly less than the theoretical quantity of hydrogen in 40 minutes. The reaction mixture was diluted with a little water, warmed and filtered to remove the catalyst. The solution was evaporated to dryness under reduced pressure to yield 18.0 g. (85%) of brown 3-amino-5-methoxybenzoic acid. Calculated for $C_8H_9NO_3$: N.E., 167.2. Found: N.E., 168; M.P. 168.3–171.3° C.

EXAMPLE 17

3-propionamido-5-methoxy-2,4,6-triiodobenzoic acid

Concentrated sulfuric acid (5 drops) was added to a mixture of 3-amino-5-methoxy-2,4,6-triiodobenzoic acid (31 g.) and propionic anhydride (100 ml.). The mixture was heated for an hour, then chilled and filtered. The cake was washed with water to give 15 g. of slightly damp crude 3-propionamido-5-methoxy-2,4,6-triiodobenzoic acid. The crude acid was dissolved in dilute ammonium hydroxide, the pH adjusted to 5 with acetic acid and the dark solution treated 3 times with decolorizing carbon. The product was precipitated by the addition of concentrated hydrochloric acid, filtered, washed with water, and redissolved in hot ethanol (200 ml.). The alcoholic solution was treated with decolorizing carbon, diluted to 500 ml. with water and cooled to 5° C. The crystals of 3-propionamido-5-methoxy-2,4,6-triiodobenzoic acid product were filtered off and dried at 100° C. for 2 hours. Yield: 8.2 g. Calculated for $C_{11}H_{10}I_3NO_4$: Neutral equivalent, 600.9; I, 63.4%. Found: N.E., 605; I, 61.9%; M.P. 243.5–244.5° C. Reworking the propionic anhydride mother liquor gave an additional 3.5 g. of product.

EXAMPLE 18

*Sodium salt of 3-propionamido-5-methoxy-2,4,6-triiodobenzoic acid*

A solution of the sodium salt of 3-propionamido-5-methoxy-2,4,6-triiodobenzoic acid was prepared by neutralizing a slurry of the acid with sodium hydroxide solution. A saturated solution of the sodium salt of 3-propionamido-5-methoxy-2,4,6-triiodobenzoic acid at 24° C. had a density of 1.2594 g./ml. The solubility of the sodium salt was found to be 45.5 g./100 ml. of solution or 56.7 g./100 ml. of water.

EXAMPLE 19

*N-methylglucamine salt of 3-propionamido-5-methoxy-2,4,6-triiodobenzoic acid*

3 - propionamido-5-methoxy-2,4,6-triiodobenzoic acid (15.2 g.) and N-methylglucamine (4.9 g.) were dissolved in enough water to make 40 ml. of solution. The solution containing the N-methylglucamine salt of 3-propionamido-5-methoxy-2,4,6-triiodobenzoic acid was filtered, then sterilized by heating it at 15 p.s.i. steam pressure for 20 minutes.

The intravenous $LD_{50}$ of this salt in mice was found to be 11,200 mg./kg. Upon administration of the solution described in the previous paragraph to two dogs at a dosage of 100 mg. of salt per kg. of body weight, good X-ray shadows of the gall bladder were produced in one dog and good shadows of the kidney in the other dog.

It will be understood that other 3-amino-5-alkoxybenzoic acids and 3-alkanamido-5-alkoxybenzoic acids may be prepared by the methods illustrated in the foregoing examples. Also, it is to be understod that other customary nontoxic salts may be conveniently prepared and employed in accordance with the present invention.

In view of the above, it will be seen that the several objects of the invention are achieved and other advantageous results obtained.

As various changes could be made in the above products and processes without departing from the scope of the invention, it is intended that all matter contained in the above description shall be interpreted as illustrative and not in a limiting sense.

I claim:

3-acetamido-5-methoxy-2,4,6-triiodobenzoic acid and the nontoxic salts thereof.

References Cited in the file of this patent

UNITED STATES PATENTS

| 2,611,786 | Wallingford | Sept. 23, 1952 |

FOREIGN PATENTS

| 517,382 | Great Britain | Jan. 29, 1940 |
| 520,436 | Belgium | June 30, 1953 |
| 748,319 | Great Britain | Apr. 25, 1956 |

OTHER REFERENCES

Epstein et al.: Chem. Absts. 49, col. 11898 (1955).